US012680637B2

(12) United States Patent
Lopez et al.

(10) Patent No.: US 12,680,637 B2
(45) Date of Patent: Jul. 14, 2026

(54) ARTICULATED ELECTRICAL CONDUIT FITTING ASSEMBLIES AND METHODS OF ASSEMBLING THEREOF

(71) Applicant: ABB Schweiz AG, Baden (CH)

(72) Inventors: Omar Alfredo Lopez, Memphis, TN (US); Andy Ali Jaffari, Memphis, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/659,335

(22) Filed: May 9, 2024

(65) Prior Publication Data

US 2025/0347371 A1     Nov. 13, 2025

(51) Int. Cl.
*F16L 27/02*     (2006.01)
*H02G 3/04*     (2006.01)

(52) U.S. Cl.
CPC ............ *F16L 27/02* (2013.01); *H02G 3/0481* (2013.01)

(58) Field of Classification Search
CPC ... F16L 27/0841; F16L 27/0849; F16L 27/04; F16L 27/047; F16L 27/042; F16L 27/0837; F16L 27/0845; H02G 3/0633
USPC ........................................................ 285/261
See application file for complete search history.

(56) References Cited

U.S. PATENT DOCUMENTS 4,831,213 A * 5/1989 Espevik ............... H02G 3/0633
5,290,075 A * 3/1994 Allread ................. F16L 27/047

5,975,588 A * 11/1999 Hesseln ................ F16L 27/047
2015/0285418 A1* 10/2015 Rempert ............... F16L 27/047
2015/0308597 A1* 10/2015 Lillmars ............... F16L 27/047

FOREIGN PATENT DOCUMENTS

WO        WO-8403132 A1 *  8/1984    ............ F16L 27/047
WO        WO-0111282 A1 *  2/2001    .......... F16L 27/0845
WO        WO-2019034893 A1 *  2/2019    ............ F16L 27/047

OTHER PUBLICATIONS

ABB Cable Glands—STED Star Teck Extreme Director Series Industrial Applications; Technical Data Sheet, ABB; available at https://search.abb.com/library/Download.aspx?DocumentID=TDS000039&LanguageCode=en&DocumentPartld&Action=Launch; 2 pp.
Sing F LTD 8pcs Ball Joint Spring Clip for M6 Rod End Ball Bearing; Replacement Linkage Rod Ball Socket; Joint Springs for Ball Joint Gas Strut End; available at https://www.amazon.com/Spring-Bearing-Replacement-Linkage-Springs/dp/B09P1GD8WK?th=1; 5 pp.

* cited by examiner

*Primary Examiner* — Zachary T Dragicevich
(74) *Attorney, Agent, or Firm* — McCarter & English, LLP; Michael M. Gnibus

(57)     ABSTRACT

An articulated fitting assembly for fabricating an electrical conduit raceway of an electrical system is provided. The fitting assembly includes a hollow cap and a hollow fitting The fitting includes a head having the first fitting end and including an arcuate fitting surface, and a fitting body having the second fitting end and extending from the head. The first fitting end is received in the second cap end, the cap coupled with the fitting at the arcuate fitting surface. The cap is positionable at a longitudinal angle between 0° and 360° with the fitting and at a radial angle in a range with the fitting. The fitting assembly is sized to receive electrical wires of the electrical conduit raceway therethrough.

23 Claims, 14 Drawing Sheets

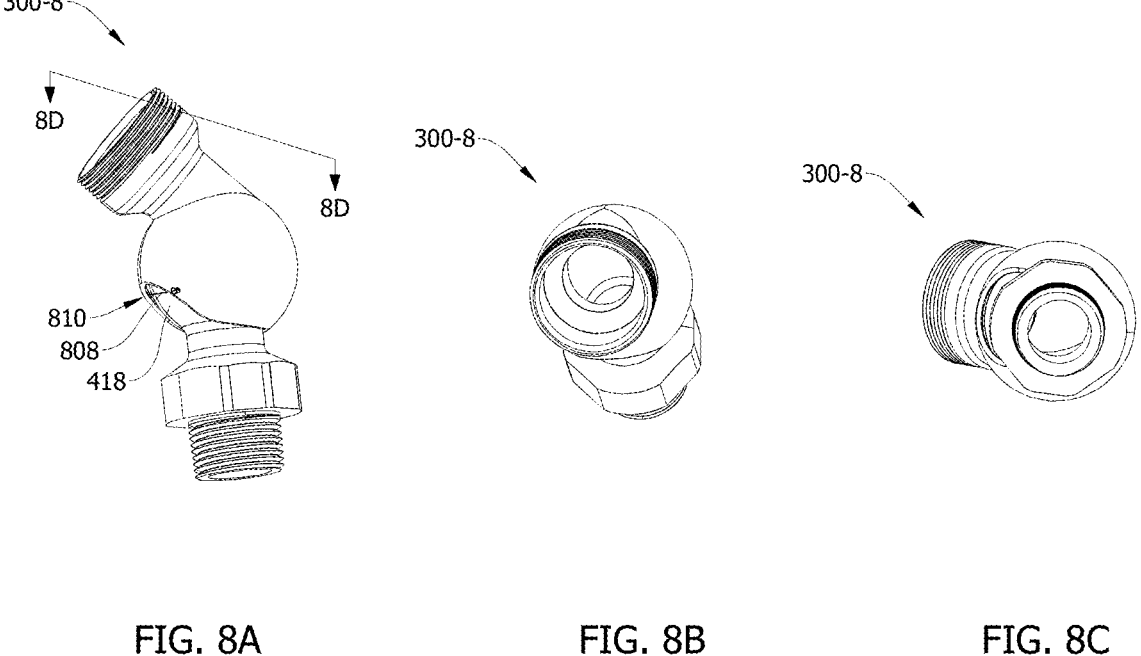
FIG. 8A                    FIG. 8B                    FIG. 8C

ARTICULATED ELECTRICAL CONDUIT FITTING ASSEMBLIES AND METHODS OF ASSEMBLING THEREOF

BACKGROUND

The field of the disclosure relates generally to raceways for electrical systems, and more particularly, to fitting assemblies and methods of assembling fitting assemblies for electrical conduit raceways for electrical systems.

Raceways are used to carry and protect electrical wiring or cabling in an electrical system of a facility, such as gas stations, refineries, power plants, or production plants. Raceways are constructed by coupling lengths of conduits with fittings. Known methods and assemblies are disadvantaged in some aspects and improvements are desired.

BRIEF DESCRIPTION

In one aspect, an articulated fitting assembly for fabricating an electrical conduit raceway of an electrical system is provided. The fitting assembly includes a hollow cap having a first cap end and a second cap end opposite the first cap end, the first cap end configured to couple with a component of an electrical conduit raceway. The fitting assembly also includes a hollow fitting having a first fitting end and a second fitting end opposite the first fitting end. The fitting further includes a head having the first fitting end and including an arcuate fitting surface, and a fitting body having the second fitting end and extending from the head. The first fitting end is received in the second cap end, the cap coupled with the fitting at the arcuate fitting surface. The fitting assembly further includes a coupler receiving the second cap end and the first fitting end therein and coupling the second cap end with the first fitting end. The cap is positionable at a longitudinal angle between 0° and 360° with the fitting and positionable at a radial angle in a range with the fitting. The fitting assembly is sized to receive electrical wires of the electrical conduit raceway therethrough.

In another aspect, an articulated fitting assembly for fabricating an electrical conduit raceway of an electrical system is provided. The fitting assembly includes a hollow cap having a first cap end and a second cap end opposite the first cap end, the first cap end configured to couple with a component of an electrical conduit raceway. The fitting assembly also includes a hollow fitting having a first fitting end and a second fitting end opposite the first fitting end. The fitting further includes a head having the first fitting end and including an arcuate fitting surface, and a fitting body having the second fitting end and extending from the head. The first fitting end is received in the second cap end, the cap coupled with the fitting at the arcuate fitting surface. The cap is positionable at a longitudinal angle between 0° and 360° with the fitting and at a radial angle in a range with the fitting. The fitting assembly is sized to receive electrical wires of the electrical conduit raceway therethrough.

In one more aspect, a method of assembling an articulated fitting assembly for fabricating an electrical conduit raceway of an electrical system is provided. The method includes forming a hollow cap having a first cap end and a second cap end opposite the first cap end, the first cap end configured to couple with a component of an electrical conduit raceway. The method also includes forming a hollow fitting having a first fitting end and a second fitting end opposite the first fitting end. The fitting further includes a head having the first fitting end and including an arcuate fitting surface, and a fitting body having the second fitting end and extending from the head. The method further includes coupling the cap with the fitting such that the first fitting end is received in the second cap end and the cap is positioned at a longitudinal angle between 0° and 360° with the fitting and at a radial angle in a range with the fitting. The fitting assembly is sized to receive electrical wires of the electrical conduit raceway therethrough.

DRAWINGS

These and other features, aspects, and advantages of the present disclosure will become better understood when the following detailed description is read with reference to the accompanying drawings in which like characters represent like parts throughout the drawings.

FIG. 6D is a cross-sectional view of the fitting assembly shown in FIG. 6A along cross-sectional line 6D-6D as marked in FIG. 6A, where the fitting assembly is at an example radial angle.

FIG. 6E illustrates the fitting assembly shown in FIG. 6D at another example radial angle.

FIG. 6F illustrates the fitting assembly shown in FIG. 6D at one more example radial angle.

FIG. 8A is a side perspective view of one more example fitting assembly.

FIG. 8B is a top perspective view of the fitting assembly shown in FIG. 8A.

FIG. 8C is a bottom perspective view of the fitting assembly shown in FIG. 8A.

DETAILED DESCRIPTION

The disclosure includes fitting assemblies and methods for assembling fitting assemblies for an electrical conduit raceway of an electrical system. Method aspects will be in part apparent and in part explicitly discussed in the following description.

Electrical conduit raceways for an electrical system are constructed using fittings and conduits. Wiring is placed inside a raceway for carrying electricity in an electrical system and supply electrical power to equipment in a facility.

Known electrical conduit systems face significant challenges in adapting to complex and confined spaces during installation, often requiring labor-intensive bending procedures and numerous fittings. The rigid nature of traditional conduit fittings limits their ability to navigate obstacles efficiently, leading to increased installation time, costs, and complexity. Additionally, existing solutions lack the flexibility needed to address diverse conduit types and sizes, hindering seamless integration of conduit systems into various environments. These limitations in flexibility and ease of installation pose considerable obstacles for electricians and installers, particularly in environments with tight corners, irregular layouts, or constrained spaces. As a result, the demand for a conduit fitting that combines enhanced flexibility, adaptability to different conduit types, and simplified installation procedures remains unmet in the field of electrical conduit raceways. Currently most of the electrical fittings in the field are locked in one position once the fittings are installed onto an enclosure or another fitting and the few that allow some type of movement once installed, are only able to change to a 90-degree orientation from the traditional "straight" orientation, where the center axis of the conduit, fitting, & enclosure entry are aligned, and once the fitting is fully installed onto the enclosure the fitting is locked in place and the installer cannot easily rotate or change the position of the fitting.

The absence of a comprehensive solution to these challenges hampers efficiency of electrical installations, leading to increased labor costs, extended project timelines, and potential compromises in the structural integrity of the conduit system.

Figures 1, 2A, 2B:
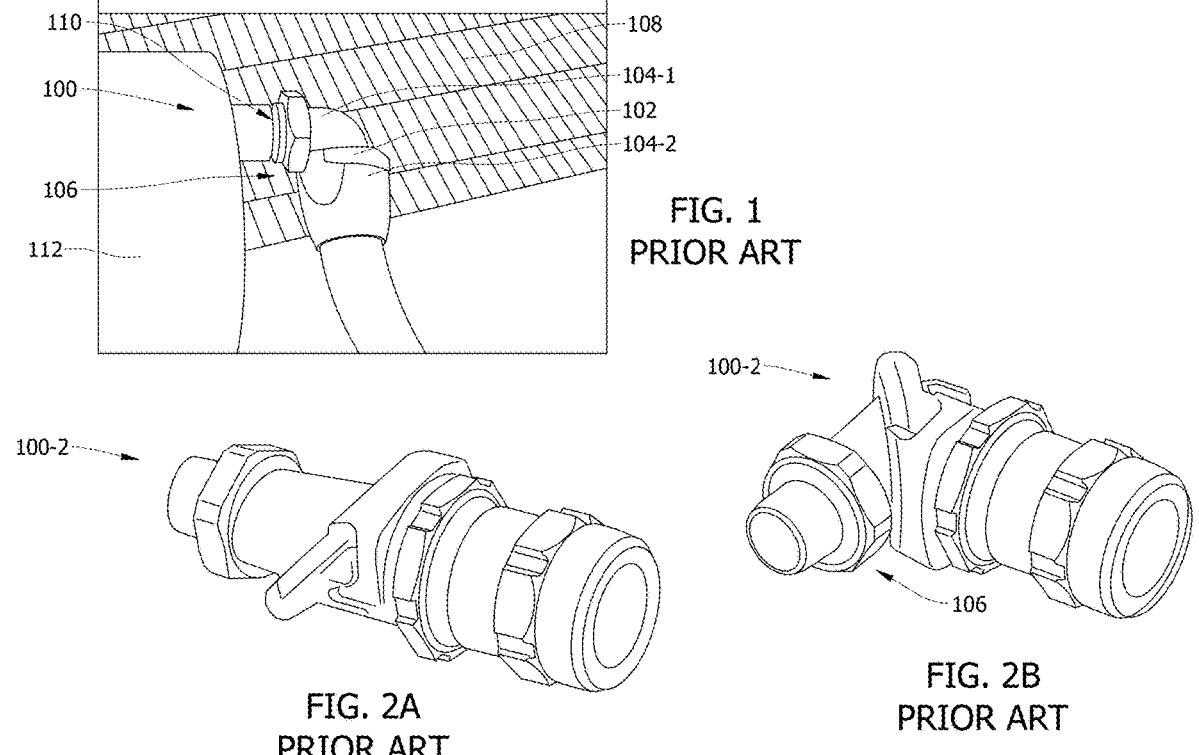
FIG. 1 shows a known fitting assembly.
FIG. 2A shows another known fitting assembly at a straight configuration.
FIG. 2B shows the fitting assembly illustrated in FIG. 2A at a 90° configuration.

FIG. 1 shows a known fitting assembly 100. The fitting assembly 100 includes an elbow 102 for changing the direction of the electrical wires inside the fitting assembly 100. The elbow 102 includes a first portion 104-1 and a second portion 104-2 at an angle 106 with the first portion 104. The angle 106 is fixed. In order to direct the wires away from the equipment 108 behind, the elbow 102 needs to face away from the equipment 108, which leaves a gap 110 between the fitting assembly 100 and a machine 112 the fitting assembly 100 is coupled to. The machine 112 may need to be rinsed with water. The gap 110 compromises the seal between the fitting assembly 100 and the machine 112 and leads to ingress of water into the electrical wires, which may disrupt delivery of electrical power and/or pose a safety risk.

FIGS. 2A and 2B show another known fitting assembly 100-2. The fitting assembly 100 may be positioned at a straight position to facilitate the passing of wires through the fitting assembly 100-2. Once the wires have been passed through, the fitting assembly 100-2 may be locked into a 90° position. The angle of the fitting assembly 100-2 is not adjustable either, like the fitting assembly 100 shown in FIG. 1.

In contrast, the fitting assemblies and methods of assembling fitting assemblies disclosed herein address the above-described problems in known fitting assemblies. The fitting assemblies disclosed herein are suitable for residential and/or industrial applications. The angle of the fitting assembly may be adjusted in two dimensions. The cap of the fitting assembly may be at any longitudinal angle in an range between 0 and 360° with the fitting of the fitting assembly. The cap may also be at a radial angle in a range with the fitting. The fitting assemblies described herein increase the range of the radial angle, such as a range of 20° or greater, while a conventional ball joint used in fields other than electrical conduit raceways may pivot only in a range of 20° or less. The adjustable angles provide convenience and flexibility in the assembling of the fitting assembly with components of the raceway despite spatial restraint, while maintaining sealing of the raceway. The adjustable radial angles are advantageous in facilitating the passing of the wires through the fitting assembly. Wires may be difficult to pass through the fitting assembly when the radial angle is approximately 90°. To pass the wires through, the fitting assembly may first be positioned at an angle greater than 90°. After the wires have been passed through, the fitting assembly may be adjusted to a desired radial angle.

Further, unlike typical ball joints used in other applications, which are not designed for facilitating electrical wires to pass through, a fitting assembly for an electrical conduit raceway needs to facilitate electrical wires to pass through the fitting assembly and the movement or adjustment of the joint of the fitting assembly should not be interfered by the wires or cause damage to the wires. The fitting assemblies disclosed herein, which include articulated joints, are unique and meet the long-felt need in the field of electrical raceways.

Figures 3A, 3B, 3C:
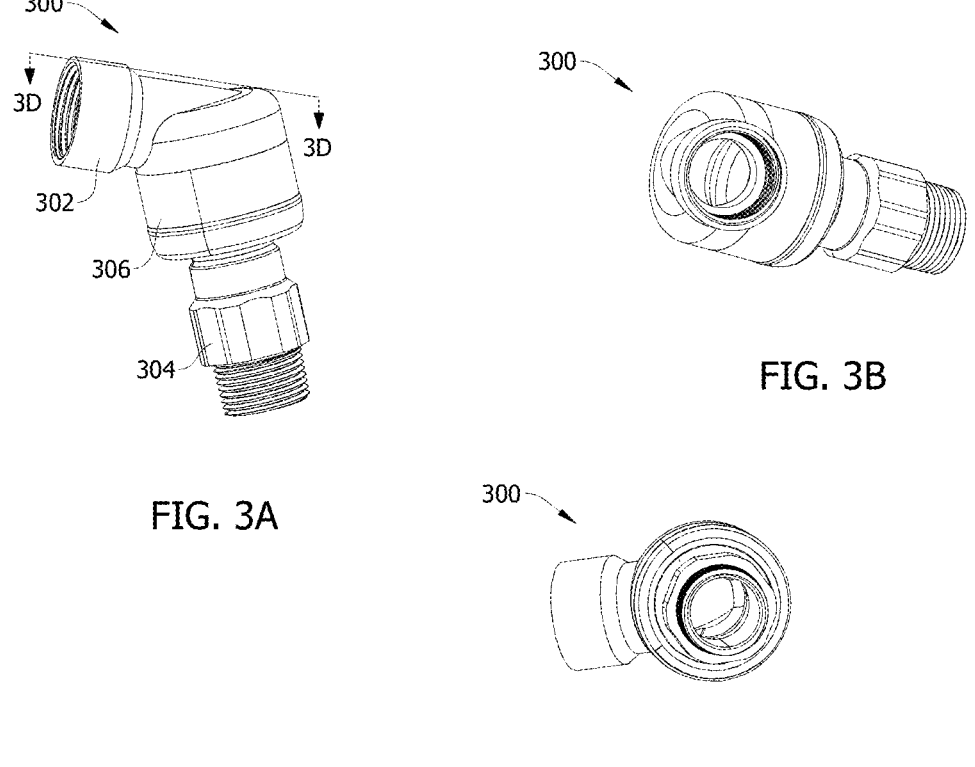
FIG. 3A is a side perspective view of an example fitting assembly.
FIG. 3B is a top perspective view of the fitting assembly shown in FIG. 3A.
FIG. 3C is a bottom perspective view of the fitting assembly shown in FIG. 3A.
Figure 3D:
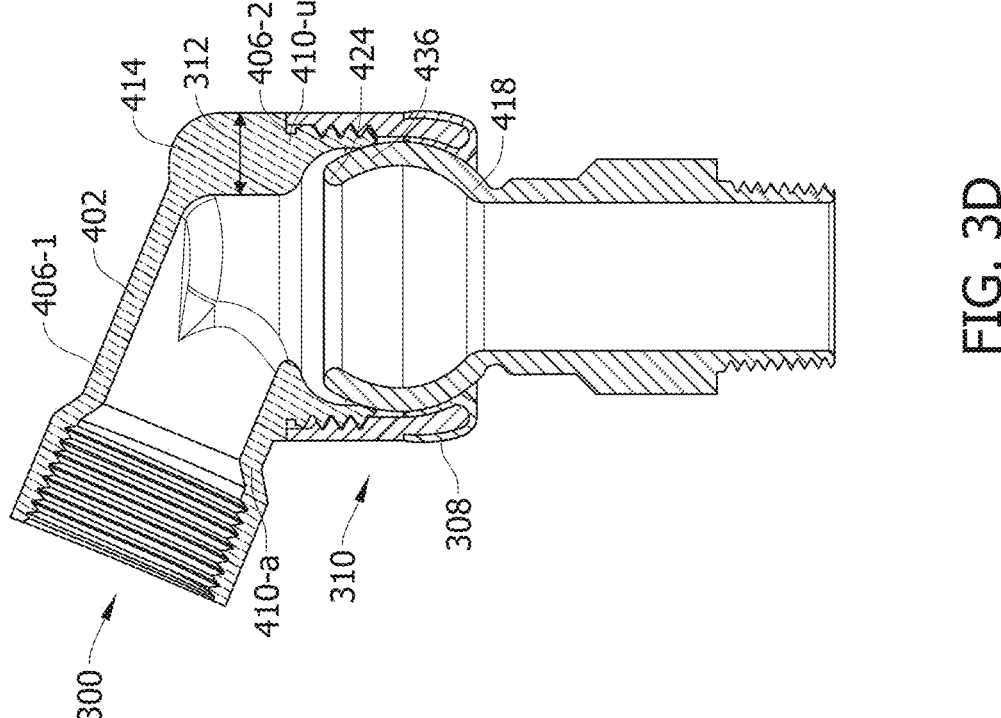
FIG. 3D is a cross-sectional view of the fitting assembly shown in FIG. 3A along cross-sectional line 3D-3D as indicated in FIG. 3A.

FIGS. 3A-3D show an example fitting assembly 300. FIG. 3A is a side perspective view of the fitting assembly 300. FIG. 3B is a top perspective view of the fitting assembly 300. FIG. 3C is a bottom perspective view of the fitting assembly 300. FIG. 3D is a cross-sectional view of the fitting assembly 300 along cross-sectional line 3D-3D as marked in FIG. 3A.

In the example embodiment, the fitting assembly 300 includes a cap 302 and a fitting 304. The fitting assembly 300 further includes a coupler 306. The coupler 306 couples the cap 302 with the fitting 304. The fitting assembly 300 may further include a sealing ring 308 configured to be coupled with the coupler 306 and seal a joint 310 in the fitting assembly 300. The joint 310 is formed by the cap 302, the fitting 304, and the coupler 306. The fitting assembly 300 advantageously provides sealing of the joint 310 such that the fitting assembly 300 is suitable for a wet or dry environment or an environment having wet and dry conditions. A wet environment refers to an environment having liquid, such as water, which may enter into the fitting assembly if not sealed and in contact with the electrical wires inside the fitting assembly, which may cause disruption of electrical power delivery in the electrical system and pose a safety risk. For example, in a process plant, the equipment may need to be rinsed down with water. Such an environment is a wet environment. A dry environment refers to an environment where liquid is not in contact with the fitting assembly.

Figure 4A:
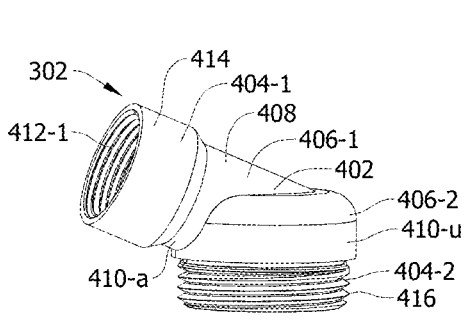
FIG. 4A is a perspective view of an example cap of the fitting assembly shown in FIG. 3A.
Figure 4B:
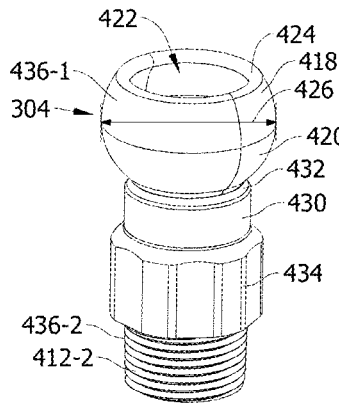
FIG. 4B is a perspective view of an example fitting of the fitting assembly shown in FIG. 3A.
Figure 4C:
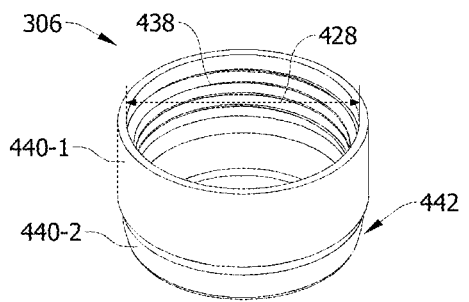
FIG. 4C is a perspective view of an example coupler of the fitting assembly shown in FIG. 3A.
Figure 4D:
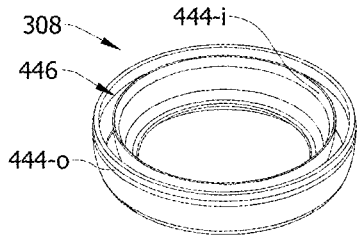
FIG. 4D is a perspective view of an example sealing ring of the fitting assembly shown in FIG. 3A.

FIGS. 4A-4D show individual components of the fitting assembly 300. FIG. 4A is a perspective view of the cap 302. FIG. 4B is a perspective view of the fitting 304. FIG. 4C is a perspective view of the coupler 306. FIG. 4D is a perspective view of the sealing ring 308.

In the example embodiment, the cap 302 and the fitting 304 are hollow such that wires may be passed through the interior of the fitting assembly 300. The cap 302 and the fitting 304 may be fabricated with metal, such as steel. In some embodiments, the cap 302 and/or the fitting 304 may be fabricated with non-metal material, such as plastic.

In the example embodiment, the cap 302 includes a cap body 402, a first cap end 404-1, and a second cap end 404-2 opposite the first cap end 404. Cap ends 404 are positioned at ends of the cap body 402. The cap body 402 includes a first portion 406 adjacent to the first cap end 404 and a second portion 406 adjacent to the second cap end 404. The first portion 406 may be cylindrical and form into a cap shaft 408. The second portion 406 may also be cylindrical. The cap body 402 may be elbowed such that the cap ends 404 orient at different directions from one another or the first portion 406 and the second portion 406 are at a non-zero angle with one another at an angled cap side 410-a, the side of the cap 302 that the first portion 406 angles toward the second portion 406.

In the example embodiment, the first cap end 404 is configured to couple with a component of an electrical raceway. The first cap end 404 may include first fitting threads 412 on a cap wall 414 of the cap 302. The first fitting threads 412 may be male threads (see FIGS. 8A-9A described later) or female threads (also see FIG. 6A-7A described later). Female threads may facilitate the coupling of a conduit with the fitting assembly 300 at the first cap end 404. Male threads may facilitate the coupling of a gland with the fitting assembly 300. The gland may serve as an adapter to be used for coupling conduits of different sizes and/or shapes. The gland may be further coupled with a conduit of a size or shape different from the size or shape of a conduit the cap 302 is designed for.

In the example embodiment, the second cap end 404 further includes cap threads 416 (also see FIG. 3D). Cap threads 416 are male threads.

In the example embodiment, the fitting assembly 300 further includes the fitting 304. The fitting 304 includes a head 418. The head 418 includes arcuate fitting surface 420. The arcuate fitting surface 420 may be in the shape of a spherical segment. The arcuate fitting surface 420 may be in other shapes that include arcuate surfaces, such as a partial sphere, an ovoid, or a partial ovoid, that enable the fitting assembly 300 to function as described herein. The head 418 is sized to be received in the second cap end 404. The head 418 defines a head opening 422 sized to facilitate wires to pass through. The head edge 424 bordering the head opening 422 is rounded such that cutting and/or damage to wires in passing the wires through the fitting assembly 300 is avoided. The outer dimension 426 of the head 418 is smaller than the inner diameter 428 of the coupler 306. The outer dimension 426 of the head 418 is the outmost dimension of the head 418, which is measured at the farthest dimension or distance between two points on the head 418.

In the example embodiment, the fitting 304 further includes a fitting body 430 extending from the head 418 and joining the head 418 at a neck 432 of the fitting 304. The fitting body 430 may be cylindrical. Ridges 434 may be positioned on an exterior of the fitting body 430 to increase the grip onto the fitting 304 during assembling or dissembling of the fitting assembly 300. The fitting 304 includes a first fitting end 436-1 proximate to the head 418 and a second fitting end 436-2 opposite the first fitting end 436-1 and distal to the head 418. The second fitting end 436-2 is positioned at an end of the fitting body 430 away from the head 418. The second fitting end 436-2 may include second fitting threads 412. In the depicted embodiment, the second fitting threads 412 are male threads. In some embodiments, the second fitting threads 412 are female threads. In other embodiments, the second fitting end 436 does not include threads and may be coupled with another component of the raceway by mechanisms, such as clamping.

In the example embodiment, the fitting assembly 300 further includes the coupler 306. The coupler 306 may be fabricated from metal such as steel. In some embodiments, the coupler 306 may be fabricated from non-metal material, such as plastic. The coupler 306 is hollow. The coupler 306 may be tubular. The interior of the coupler 306 may be cylindrical. The exterior of the coupler 306 may be cylindrical. The exterior of the coupler 306 may be in other shapes, such as cuboids, that enable the fitting assembly 300 to function as described herein. The coupler 306 includes coupler threads 438 positioned in the interior of the coupler 306. Coupler threads 438 are female threads. The coupler 306 is sized to receive the second cap end 404 and the head 418 therein. The coupler 306 includes a first coupler end 440-1 and a second coupler end 440-2 opposite the first coupler end 440-1. The coupler 306 may define a coupler indention 442 at the second coupler end 440-2.

In the example embodiment, the fitting assembly 300 further includes the sealing ring 308. The sealing ring 308 may be fabricated from an elastomeric material, such as rubber or plastic. The sealing ring 308 may be fabricated using mechanisms, such as injection molding. The sealing ring 308 includes an outer ring 444-o and an inner ring 444-i. The sealing ring 308 defines a groove 446 between the outer ring 444-o and the inner ring 444. The sealing ring 308 is sized to couple with the coupler 306 such that the outer ring 444-o is received in the coupler indention 442 and the second coupler end 440 is sandwiched between the outer ring 444-o and the inner ring 444-i. The sealing ring 308 wraps around the second coupler end 440. The sealing ring 308 may be formed as one single piece. In some embodiments, the fitting assembly 300 does not include a sealing ring 308, when sealing is unnecessary.

Figures 5A, 5B, 5C, 5D:
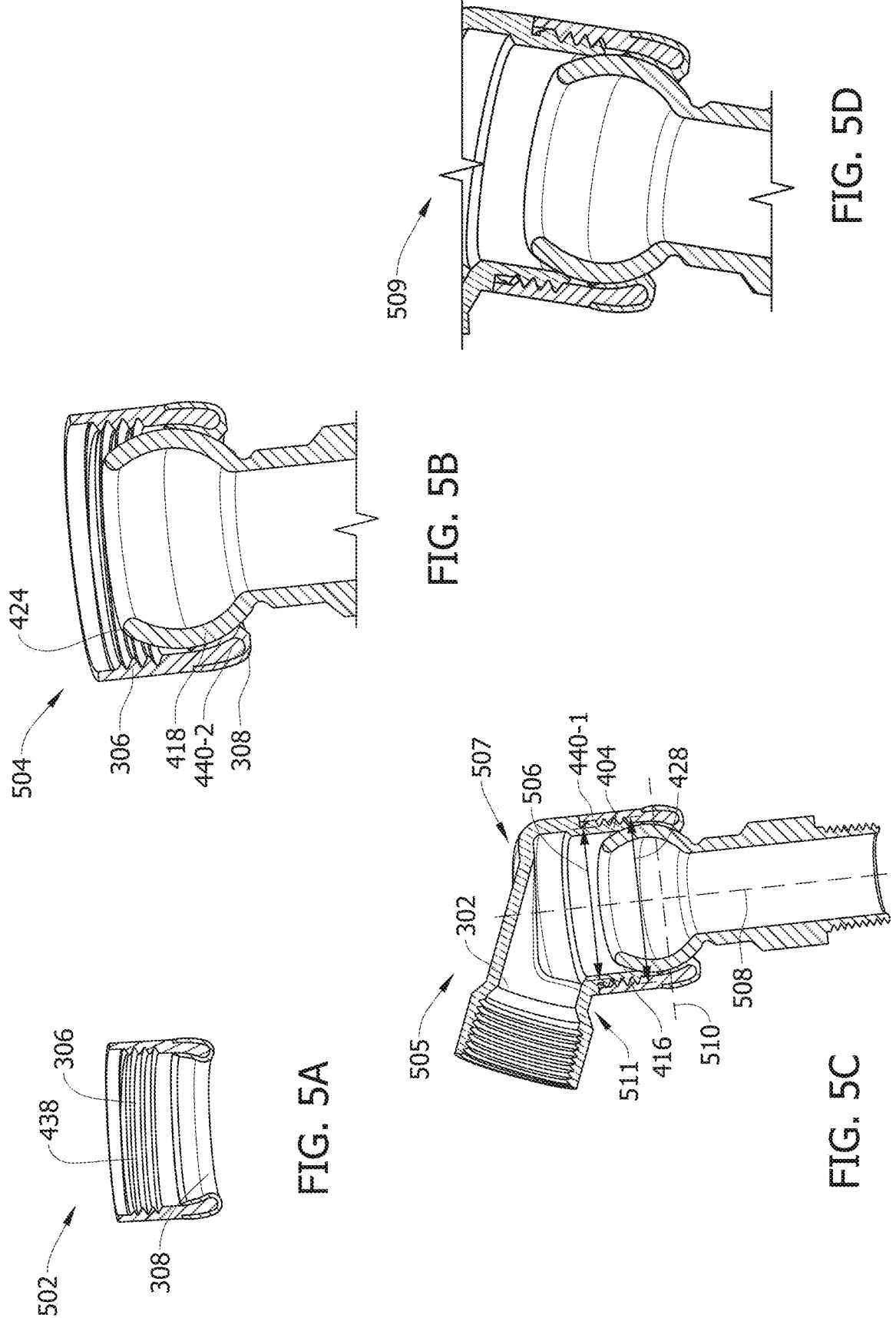
FIGS. 5A-5D show an example method of assembling the fitting assembly illustrated in FIGS. 3A-4D.

FIGS. 5A-5D show an example method of assembling the fitting assembly 300. In the example embodiment, to assemble the fitting assembly 300, the coupler 306 is first coupled 502 with the sealing ring 308 (FIG. 5A). The sealing ring 308 may have been preassembled with the coupler 306, and coupling 502 the coupler 306 with the sealing ring 308 is not needed. The sealing ring 308 may be coupled with the coupler 306 via friction between the sealing ring 308 and the coupler 306. The strength of the coupling may be increased by adding adhesives between the sealing ring 308 and the coupler 306.

In the example embodiment, the fitting 304 is then inserted 504 into the coupler 306 such that the head 418 or at least part of the head 418 of the coupler 306 is positioned inside the coupler 306 (FIG. 5B). The fitting 304 is inserted into the coupler 306 from the second coupler end 440-2 such that the sealing ring 308 is distal to the head edge 424 of the head 418.

In the example embodiment, the exterior diameter 506 of the cap 302 at the second cap end 404 is slightly smaller than the inner diameter 428 of the coupler 306 such that the second cap end 404 may be inserted into the coupler 306 and the cap threads 416 may be engaged with the coupler threads 438. In assembling the fitting assembly, the cap 302 is inserted 505 into the coupler 306 from the first coupler end 440-1 by inserting the second cap end 404 between the coupler 306 and the head 418 and engaging the cap threads 416 with the coupler threads 438 (FIG. 5C). The cap threads 416 and the coupler threads 438 are complementary. The cap threads 416 are partially engaged with the coupler threads 438, where the coupler threads 438 are not threaded to the end of the cap threads 416. With the partial engagement of the coupler threads 438 with the cap threads 416, the fitting 304 may be pivoted on the arcuate fitting surface 420 of the head 418 and the orientation of the cap 302 relative to the fitting 304 may be adjusted by pivoting the fitting 304. The cap 302 may be rotated in a longitudinal angle 507 between 0° to 360° around the longitudinal axis 508 of the fitting 304. A longitudinal angle of a fitting assembly 300 or a longitudinal angle of the cap 302 with the fitting 304 refers the angle that the cap 302 rotates away from a radial axis 510 around the longitudinal axis 508 of the fitting 304. Pivoting of the fitting 304 enables the adjustment of the radial angle 511 of the cap 302 with the fitting 304. A radial angle of a fitting assembly 300 or a radial angle of the cap 302 with the fitting 304 refers to the angle between the cap shaft 408 and the fitting body 430, and may be determined based on the angle of the cap shaft 408 relative to the radial axis 510 of the fitting 304. The radial angle 511 may be adjusted in a range. A convention ball joint may pivot only 20° or less. The elbowed cap 302 increases the adjustment range of the radial angle 511. The adjustment range may be 20° or greater, such as 45°.

Conventional ball joints used in applications other than electrical raceways typically are not designed with the capability of locking at a certain position, and instead the joint freely rotates. In the example embodiment, once the cap 302 and/or the fitting 304 are adjusted to a desired longitudinal angle 507 and/or a desired radial angle 511, the positions of the components of the fitting assembly 300 may be locked 509 by fully engaging the coupler threads 438 with the cap threads 416, where coupler threads 438 are threaded to the end of the cap threads 416 (FIG. 5D). The sealing ring 308 holds against the head 418, sealing the joint 310 of the fitting assembly 300 formed by the cap 302, the coupler 306, and the fitting 304 to prevent ingress of substances, such as liquid like water, into the joint 310. The second coupler end 440 may curve inward to increase the strength of the hold of the coupler 306 and the seal with the fitting 304. In some embodiments, the sealing ring 308 is inserted and coupled with the coupler 306 after the positions of the components are locked.

In operation, the fitting assembly 300 is used to couple with conduits or other components of the raceway in assembling the raceway. The conduits and/or other components are coupled with the fitting assembly 300 at the first cap end 404 and the second fitting end 436. The first and second fitting threads 412 are used to couple conduits and/or other components with the fitting assembly 300.

During the assembling of the raceway, wires are passed through the fitting assembly 300. Referring back to FIG. 3D, in depicted embodiment, a thickness 312 of a cap wall 414 may be increased at an un-angled cap side 410-u of the cap 302, which is the side opposite the angled cap side 410-a. As a result, an interior of the cap 302 at a location adjacent to the joining point between the first and second portions 406-1, 406-2 of the cap body 402 is flush with an interior of the first fitting end 436 at a head edge 424 of a head 418 of the fitting 304. Flush interior of the fitting assembly 300 at the un-angled cap side 410-u is advantageous in passing the wires, where the wires are restricted from being inserted and stuck behind the head 418. The thickness 312 may be increased by adding extra material, such as plastic, at the interior of the cap 302, and/or fabricating the cap 302 with increased thickness 312 by mechanisms, such as casting or molding.

Figures 6A, 6B, 6C:
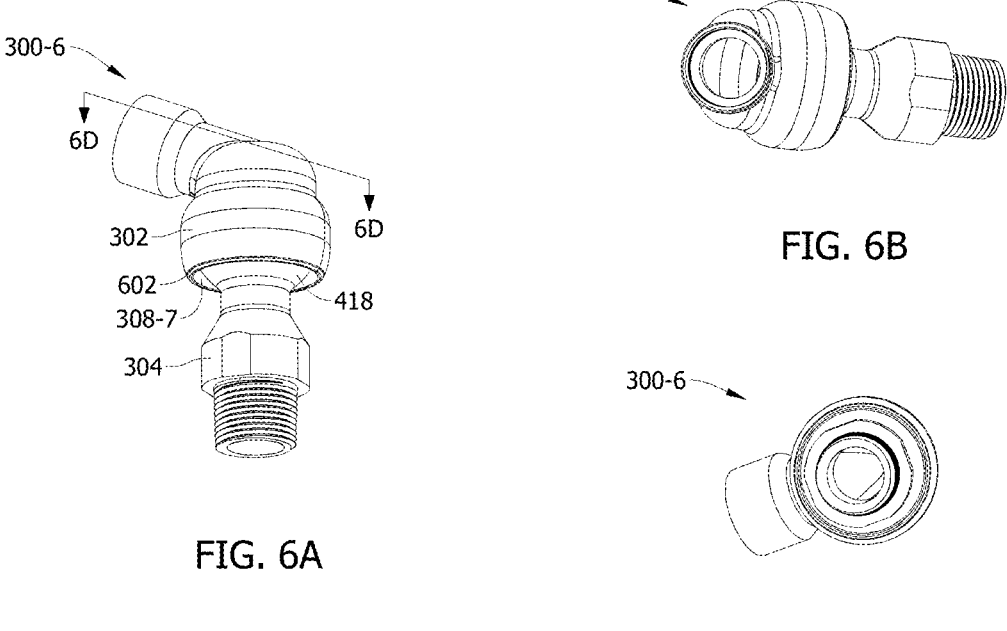
FIG. 6A is a perspective view of another example fitting assembly.
FIG. 6B is a top perspective view of the fitting assembly shown in FIG. 6A.
FIG. 6C is a bottom perspective view of the fitting assembly shown in FIG. 6A.
Figures 6D, 6E, 6F:
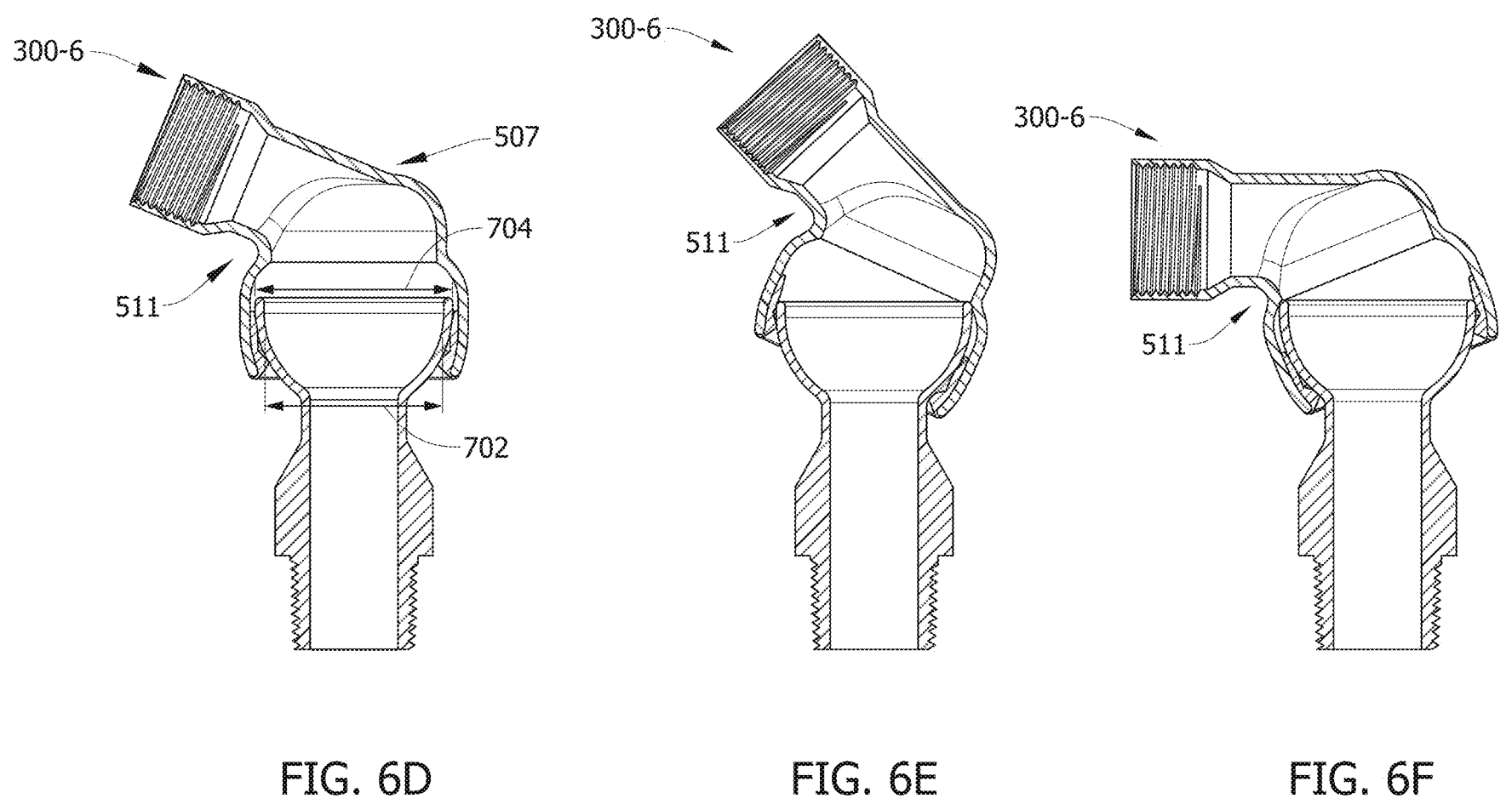

FIGS. 6A-7C show another example fitting assembly 300-6. FIG. 6A is a side perspective view of the fitting assembly 300-6. FIG. 6B is a top perspective view of the fitting assembly 300-6. FIG. 6C is a bottom perspective view of the fitting assembly 300-6. FIG. 6D is a cross-sectional view of the fitting assembly 300-6 along cross-sectional line 6D-6D as marked in FIG. 6A, where the fitting assembly 300-6 is at a first radial angle 511. FIG. 6E shows the fitting assembly 300-6 illustrated in FIG. 6D at another radial angle 511. FIG. 6F shows the fitting assembly 300-6 illustrated in FIG. 6D at one more radial angle 511.

In the example embodiment, compared to the fitting assembly 300 shown in FIGS. 3A-5D, the fitting assembly 300-6 does not include a coupler 306. The cap 302 couples with the fitting 304. The fitting 304 is restricted from dislocating out of the cap 302 due to the smaller dimension or diameter at the second cap end 404 than at the head 418 of the fitting 304. The larger dimension of the head 418 prevents the fitting 304 from dislodging out of the cap 302 once the fitting assembly 300-6 is assembled.

Figures 7A, 7B, 7C:
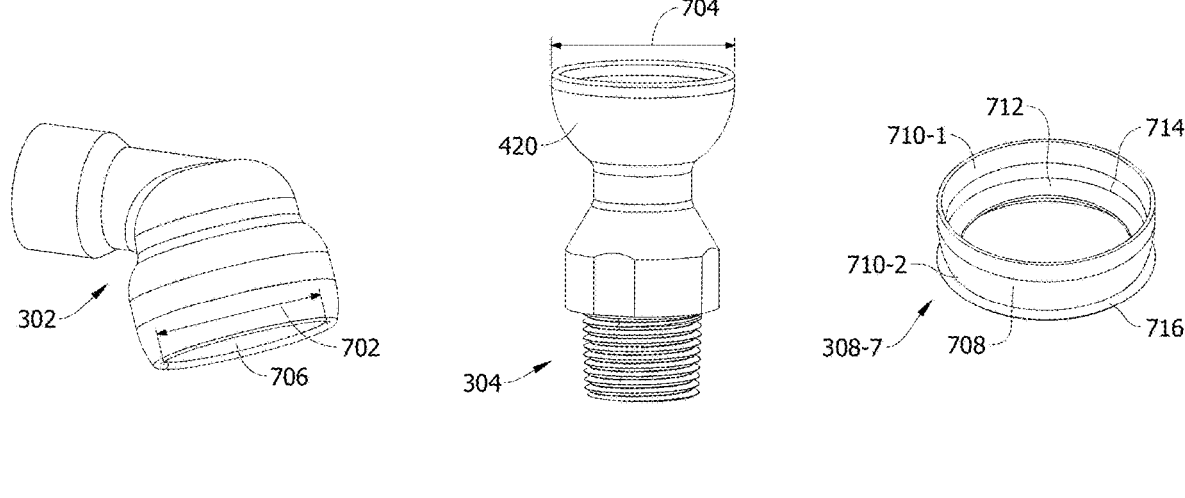
FIG. 7A is a perspective view of an example cap of the fitting assembly shown in FIG. 6A.
FIG. 7B is a perspective view of an example fitting of the fitting assembly shown in FIG. 6A.
FIG. 7C is a perspective view of an example sealing ring of the fitting assembly shown in FIG. 6A.

FIGS. 7A-7C show individual components of the fitting assembly 300-6. FIG. 7A is a perspective view of the cap 302. FIG. 7B is a perspective view of the fitting. FIG. 7C is a perspective view of a sealing ring 308-7.

In the example embodiment, the fitting assembly 300-6 includes the cap 302 and the fitting 304. The dimension 702, or the inner diameter, at the second cap end 404 by itself or with the sealing ring 308-7 coupled is smaller or than the dimension 704 of the head 418 of the fitting 304 (also see FIG. 6D). As a result, the cap 302 stay coupled with the fitting 304 once the cap 302 is assembled with the fitting 304. The cap 302 may include an arcuate cap surface 706 (also see FIGS. 8A-9A). The arcuate cap surface 706 may be similar to at least part of the arcuate fitting surface 420, or the arcuate cap surface 706 follows a shape of the arcuate fitting surface 420.

In the example embodiment, the fitting assembly may further include a sealing ring 308-7. The sealing ring 308 includes a ring body 708, a first ring end 710, and a second ring end 710 opposite the first ring end 710. The sealing ring 308 may include an inner ridge 712 positioned along a rim 714 of the sealing ring 308 at the second ring end 710 and projecting inward from the ring body 708. The inner ridge 712 reduces the dimension of the sealing ring 308 and increase the seal. The sealing ring 308 may further include an outer ridge 716 position along the rim 714 of the sealing ring 308 but projecting outward from the ring body 708. The outer ridge 716 functions as a stopper to restrict an assembler from inserting the sealing ring 308-7 too far into the cap 302.

Referring back to FIGS. 6A-6F, in operation, to assemble the fitting assembly 300, before coupling the cap 302 with the fitting 304, the opening of the cap 302 at the second cap end 404 has not formed into the final shape such that the dimension at the opening is greater than the dimension of the head 418 of the fitting 304. The head 418 of the fitting 304 is positioned through the opening. The cap 302 is then processed and formed into the final shape. The fitting assembly may be formed by mechanisms, such as stamping. In the depicted embodiment, the opening of the cap 302 is slightly greater than the dimension of the head 418, and the head 418 may be directly inserted through the opening.

In the depicted embodiment, the fitting assembly 300 includes the sealing ring 308. The sealing ring 308 may be coupled with the cap 302 before assembling the cap 302 with the fitting 304. Alternatively, the sealing ring 308 is coupled with the cap 302 after the assembling of the cap 302 with the fitting 304. The sealing ring 308 may be inserted into the cap 302 at the second cap end 404 until the outer ridge 716 of the sealing ring 308 is in contact with a cap edge 602 of the cap 302 at the second cap end 404. Adhesive may be placed on the exterior of the sealing ring 308 and/or the interior of the cap 302 at the second cap end 404 to increase the coupling strength of the sealing ring 308 with the cap 302. The sealing ring 308 restricts the fitting 304 from dislocating out of the cap 302. The sealing ring 308 also provides sealing of the joint 310 formed by the cap 302 and the fitting 304. With the sealing ring 308, the fitting assembly 300 may be versatilely used in a wet or dry environment or an environment having wet and dry conditions.

In the example embodiment, in the fitting assembly 300-6, the cap 302 and the fitting 304 are rotatably coupled with one another. The cap 302 may be rotated around the longitudinal axis 508 of the fitting 304 at any angle between 0° and 360°, where the cap 302 may be positioned at any longitudinal angle 507. The fitting 304 may be pivoted relative to the cap 302 such that the radial angle 511 of the cap 302 formed with the fitting 304 is not fixed, and the cap 302 instead is positionable at any radial angle 511 in a range. The elbowed cap 302 increases the adjustment range of the radial angle 511. The adjustment range may be 20° or greater, such as 45°.

Figure 8E:
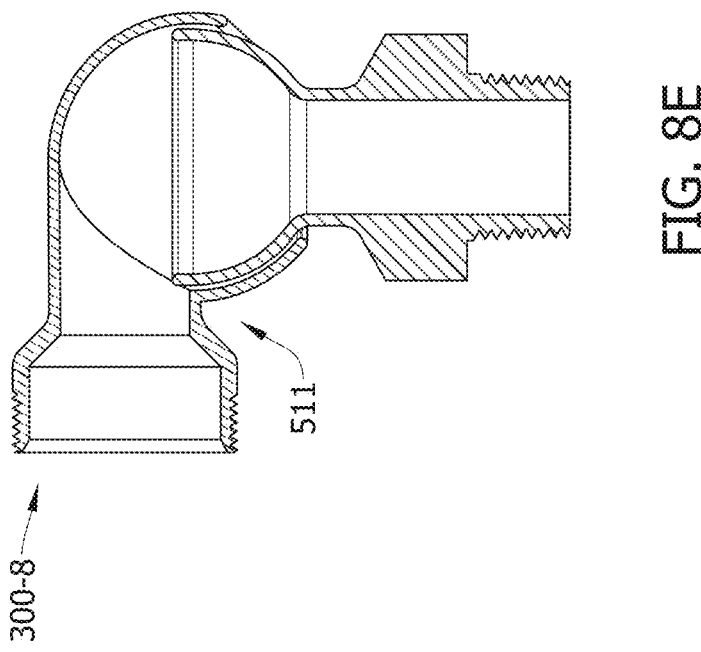
FIG. 8E shows the fitting assembly illustrated in FIG. 8D at another example radial angle.
Figure 8D:
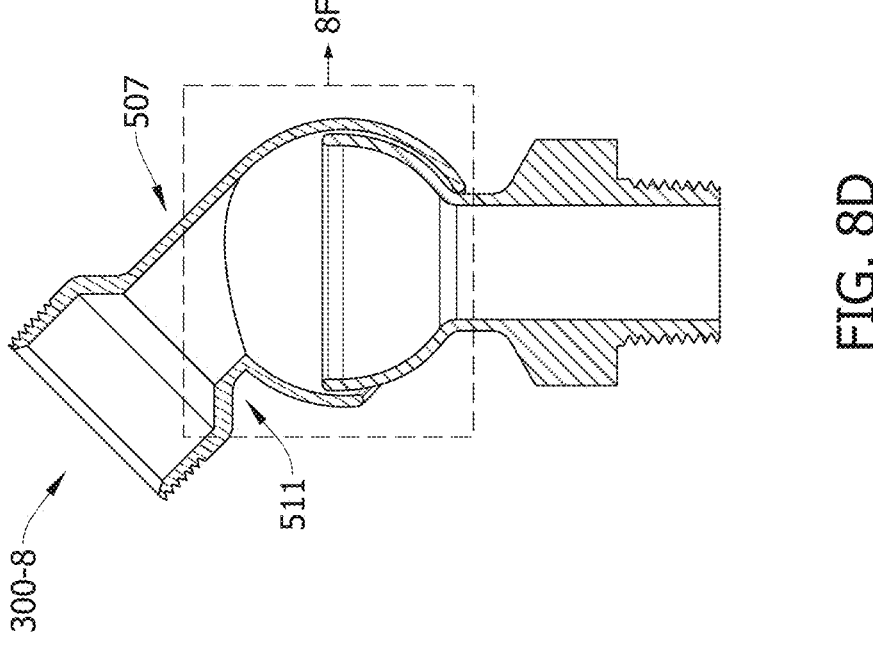
FIG. 8D is a cross-sectional view of the fitting assembly shown in FIG. 8A along cross-sectional line 8D-8D as marked in FIG. 8A, where the fitting assembly is at an example radial angle.
Figures 8F, 8G:
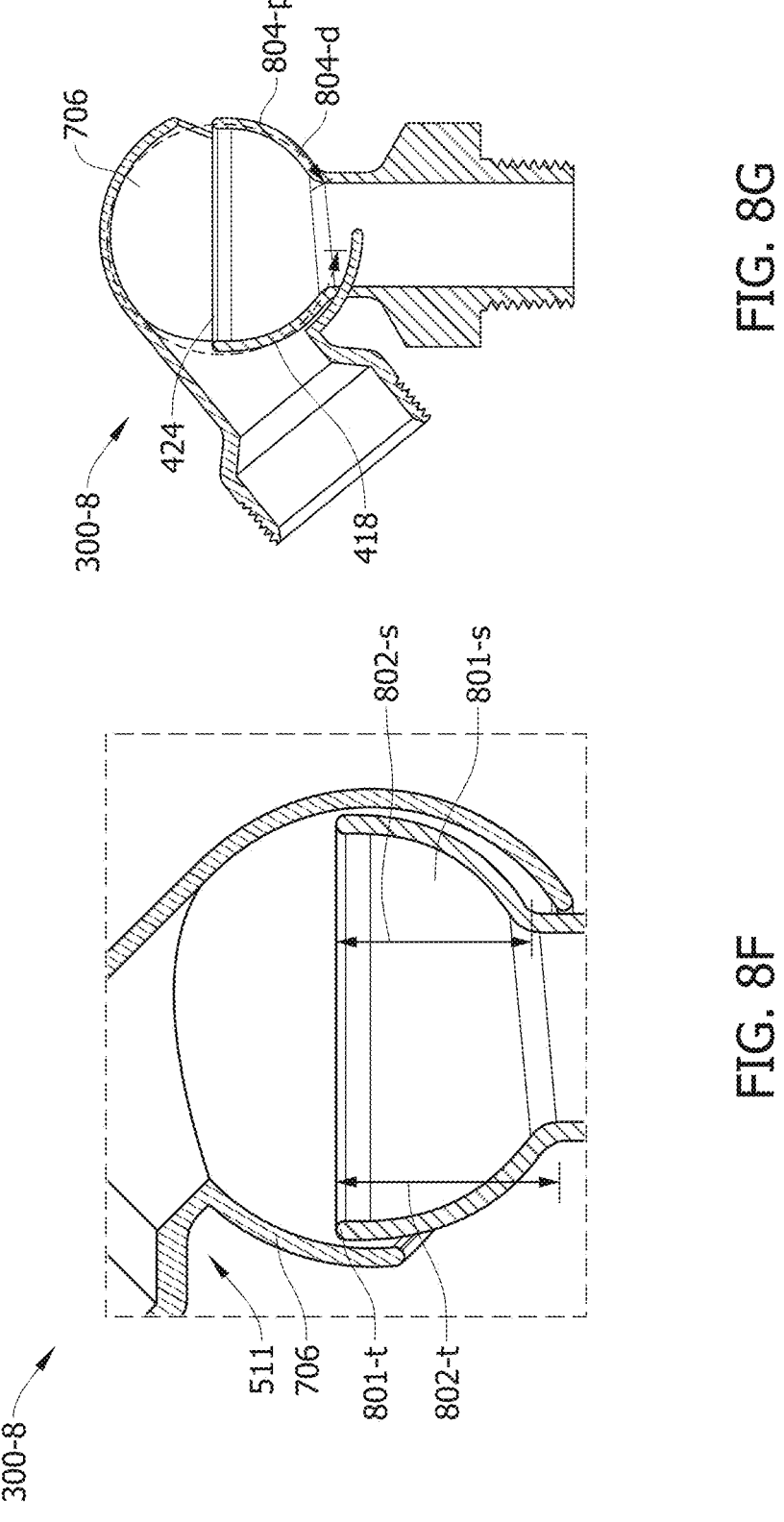
FIG. 8F is an enlarged view of a portion of the fitting assembly shown in FIG. 8D.
FIG. 8G is a schematic diagram showing relative spatial and dimensional relationship between the cap and the fitting of the fitting assembly shown in FIG. 8A.

FIGS. 8A-8G show one more example fitting assembly 300-8. FIG. 8A is a side perspective view of the fitting assembly 300-8. FIG. 8B is a top perspective view of the fitting assembly 300-8. FIG. 8C is a bottom perspective view of the fitting assembly 300-8. FIG. 8D is a cross-sectional view of the fitting assembly 300-8 along cross-sectional line 8D-8D as marked in FIG. 8A, where the fitting assembly 300-8 is at an example radial angle 511. FIG. 8E shows the fitting assembly 300-8 at another example radial angle 511. FIG. 8F is an enlarged view of a portion of the fitting assembly 300 as marked in FIG. 8D. FIG. 8G is a schematic diagram showing the spatial and dimensional relationship between the cap 302 and the fitting 304 of the fitting assembly 300-8.

In the example embodiment, like the fitting assembly 300-6 shown in FIGS. 6A-7C, the fitting assembly 300-8 does not include a coupler 306. Compared to the fitting assembly 300-6, where the profile of the cap edge 602 is in one plane, the profile of the cap edge 602 is in at least two planes.

Figure 9A:
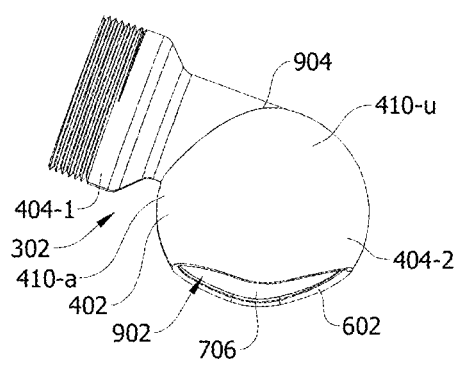
FIG. 9A is a perspective view of an example cap of the fitting assembly shown in FIG. 8A.
Figure 9B:
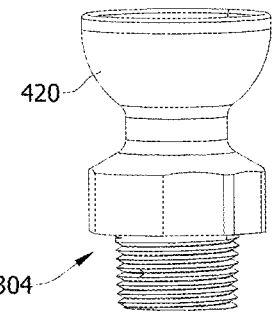
FIG. 9B is a perspective view of an example fitting of the fitting assembly shown in FIG. 8A.

FIGS. 9A and 9B show individual components of the fitting assembly 300-8. FIG. 9A is a perspective view of the cap 302. FIG. 9B is a perspective view of the fitting 304.

In the example embodiment, the fitting assembly 300-8 includes the cap 302 and the fitting 304. The cap 302 rotatably coupled with the fitting 304. The cap edge 602 of the cap 302 at the second cap end 404 is in at least two planes. The cap edge 602 curves toward the cap body 402 at a first cap side 410, compared to the second cap side 410. The size of the cap opening 902 defined by the cap edge 602, therefore is increased. The cap 302 is elbowed. The elbowed cap 302 may be angled toward the angled cap side 410-a. At the angled cap side 410, the cap edge 602 curves upwards toward the cap body 402. The cap 302 extends farther from a mouth 904 of the cap shaft 408 at the un-angled cap side 410-u, the side opposite the angled cap side 410-a.

Referring back to FIGS. 8F and 8G, in the example embodiment, the head 418 of the fitting 304 may have different heights at different sides. For example, at the first fitting side 801-t, the height 802-t of the head 418 is greater than the height 802-s at the second fitting side 801-s. To assemble the fitting assembly 300, the head 418 is inserted into the cap 302 such that the taller fitting side 801-t of the head 418 is at the angled cap side 410-a and the shorter fitting side 801-s of the head 418 is at the un-angled cap side 410-u. The increased height 802 at the angled cap side 410 may increase the range of the radial angle 511 of the cap 302 with the fitting 304. The cap 302 may be rotated in the counter clock direction as far as the cap edge 602 at the angled cap side 410 meets the neck 432 of the fitting 304 such that the cap 302 is prevented by the neck 432 from rotating further. The cap 302 may be rotated in the counter clock direction as far as the cap edge 602 at the un-angled cap side 410 meets the neck 432 such that the cap 302 is prevented by the neck 432 from rotating further. The cap surface 706 may have the same curvature as or similar curvature to the head 418 such that the cap body 402 and the head 418 rotate along the exterior surface of the head 418 and/or the interior surface of the cap body 402.

In the example embodiment, the head 418 may have a curvature at an area 804-p proximate the head edge 424 of the head 418 smaller than an area 804-d distal to the head edge 424 (see FIGS. 8F and 8G). The head 418 may have the same curvature as the cap surface 706 at the distal area 804 and a smaller curvature at the proximate area than the cap surface 706. As a result, the head edge 424 of the head 418 limits the cap 302 from rotating further and becoming disengaged from the head 418.

In the depicted embodiment, the cap opening 902 defined by the second cap end 404 is not large enough to receive the head 418 therethrough. During assembling of the fitting assembly 300, before forming the cap end 404 into the final shape, the head opening 422 is large enough to receive the head 418. The head 418 is first positioned with the cap 302. The angled fitting side 801-a of the cap 302 may be positioned at the same side as the tall fitting side 801-t of the head (see FIG. 8F). Once the fitting 304 is placed at a desired position relative to the cap 302, the opening is formed into the final shape. The fitting assembly 300 may be fabricated by metal forming mechanisms, such as stamping.

In some embodiments, the fitting assembly 300 may be assembled by directly inserting the fitting 304 into the head opening 422 defined by the second cap end 404, when the head opening 422 is large enough to receive the head 418 therethrough. To restrict the fitting 304 from dislocating out of the cap 302, a clip 808 may be used (see FIG. 8A). For example, clip apertures 810 are defined at locations proximate the cap edge 602 of the second cap end 404. The clip 808 may include a wire with ends coupled with the cap 302 in the clip apertures 810. The clip 808 restricts the fitting 304 from dislocating out of the cap 302.

In the fitting assemblies 300-6, 300-8, the cap 302 and the fitting 304 rotatably couple with one another. Rotatably coupling is advantageous in strain relief of electrical wires inside the fitting assembly 300. For example, if the wires move, the cap 302 and/or the fitting 304 move with the wires, thereby limiting strain or damage to the wires.

Conventional ball joints used in applications other than electrical raceways only provide with rotation in one dimension. The fitting assemblies disclosed herein provide two dimensional rotation and/or adjustment, improving the convenience and reducing costs in assembling of electrical raceways.

Figure 10:
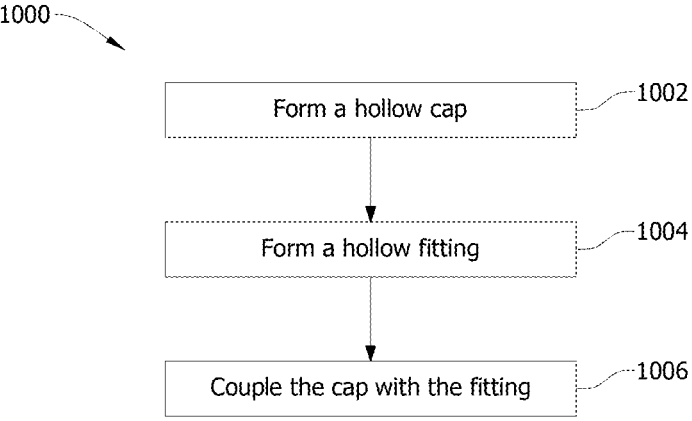
FIG. 10 is a flow chart of an example method for assembling the fitting assemblies shown in FIGS. 3A-9B.

FIG. 10 is a flow chart of an example method 1000 of assembling a fitting assembly. In the example embodiment, the method 1000 includes forming 1002 a hollow cap. Example caps are caps 302 disclosed herein. The method 1000 also includes forming 10004 a hollow fitting. Example fittings are fittings 304 disclosed herein. The method 1000 further includes coupling 1006 the cap with the fitting such that the first fitting end of the fitting is received in the second cap end of the cap, and the cap is positioned at a longitudinal angle between 0° and 360° and at a radial angle in a range.

At least one technical effect of the systems and methods described herein includes (a) a fitting assembly that has a longitudinal angle between 0° and 360° and a radial angle in a range; (b) a fitting assembly with sealing of the joint; (c) a fitting assembly having adjustable radial angles to facilitate passing electrical wires through the fitting assembly; (d) an elbowed cap of a fitting assembly to increase an adjustment range of the radial angle of the fitting assembly; and (e) a fitting assembly having a cap and a fitting rotatably coupled with one another.

Example embodiments of fitting assemblies and methods for assembling fitting assemblies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" and/or "substantially" as applied to a particular value of a range applies to both values, and unless otherwise dependent on the precision of the instrument measuring the value, may indicate +/−10% of the stated value(s).

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An articulated fitting assembly for fabricating an electrical conduit raceway of an electrical system, the fitting assembly comprising:

a hollow cap having a first cap end and a second cap end opposite the first cap end, the first cap end configured to couple with a component of an electrical conduit raceway;

a hollow fitting having a first fitting end and a second fitting end opposite the first fitting end, the fitting further comprising:

a head arranged at the first fitting end and comprising a single arcuate fitting surface; and a fitting body having the second fitting end and extending from the head, wherein the first fitting end is received in the second cap end, the cap coupled with the fitting at the single arcuate fitting surface; and a coupler receiving the second cap end and the first fitting end therein and coupling the second cap end with the first fitting end such that the coupler and the second cap end both contact the single arcuate fitting surface, wherein:

the coupler comprises a sealing ring having an inner ring and an outer ring that are joined to form a groove therebetween, the groove being arranged to capture a second end of the coupler therein, and the cap is positionable at a longitudinal angle between 0° and 360° with the fitting and positionable at a radial angle in a range with the fitting, the fitting assembly sized to receive electrical wires of the electrical conduit raceway therethrough.

2. The fitting assembly of claim 1, wherein the cap comprises cap threads at the second cap end, the coupler comprising coupler threads complementary to the cap threads, the coupler threads engaging with the cap threads in coupling the second cap end with the first fitting end.

3. The fitting assembly of claim 2, wherein the cap is rotatably coupled with the fitting when the coupler threads are partially engaged with the cap threads.

4. The fitting assembly of claim 2, wherein the fitting assembly is locked at the longitudinal angle and the radial angle when the coupler threads are fully engaged with the cap threads.

5. The fitting assembly of claim 1, wherein the cap comprises an increased thickness such that an interior of the cap at the increased thickness is flush with an interior of the first fitting end.

6. The fitting assembly of claim 1, wherein the radial angle has a maximum adjustment of the cap is between 20° and 45°.

7. The fitting assembly of claim 1, wherein an exterior of the coupler is cylindrical.

8. An articulated fitting assembly for fabricating an electrical conduit raceway of an electrical system, the fitting assembly comprising:

a hollow cap having a first cap end and a second cap end opposite the first cap end, the first cap end configured to couple with a component of an electrical conduit raceway; and a hollow fitting having a first fitting end and a second fitting end opposite the first fitting end, the fitting further comprising:

a head arranged at the first fitting end and comprising a single arcuate fitting surface extending from the first fitting end to a fitting body, wherein:

the fitting body extends from the head to the second fitting end, the head is received in the second cap end, the cap coupled with the fitting at the single arcuate fitting surface, the cap is coupled with the fitting via a coupler arranged about the second cap head and the single arcuate fitting surface, the coupler being defined by a first coupler end and a second coupler end, a sealing ring formed with a groove therein is arranged on the coupler such that the second coupler end is located in the groove, and the cap is positionable at a longitudinal angle between 0° and 360° with the fitting and at a radial angle in a range with the fitting, the fitting assembly sized to receive electrical wires of the electrical conduit raceway therethrough.

9. The fitting assembly of claim 8, wherein the cap has an elbow shape.

10. The fitting assembly of claim 8, wherein the cap is rotatably coupled with the fitting.

11. The fitting assembly of claim 8, wherein the second cap end comprises an arcuate cap surface.

12. The fitting assembly of claim 8, wherein a cap edge of the second cap end has a profile in at least two planes.

13. The fitting assembly of claim 12, wherein a curvature of the arcuate fitting surface is smaller at an area proximate to a head edge of the head than an area distal to the head edge.

14. The fitting assembly of claim 12, wherein a first side of the first fitting end has a greater height than a second side of the first fitting end.

15. The fitting assembly of claim 8, wherein a cap edge of the second cap end has a profile in a plane.

16. The fitting assembly of claim 8, further comprising a sealing ring coupled with the second cap end.

17. The fitting assembly of claim 8, wherein a head edge of the head is rounded.

18. The fitting assembly of claim 8, wherein the first cap end comprises male threads and/or female threads.

19. A method of assembling an articulated fitting assembly for fabricating an electrical conduit raceway of an electrical system, the method comprising:

forming a hollow cap having a first cap end and a second cap end opposite the first cap end, the first cap end configured to couple with a component of an electrical conduit raceway;

forming a hollow fitting having a first fitting end and a second fitting end opposite the first fitting end, the fitting further including:

a head arranged at the first fitting end and including a single arcuate fitting surface extending from the first fitting end to a fitting body, wherein the fitting body extends from the head to the second fitting end and extending from the head;

forming a coupler shaped to receive the second cap end and the first fitting end therein;

coupling a sealing ring to the coupler, the sealing ring comprising an inner ring and an outer ring that are joined to form a groove therebetween, the groove being arranged to capture a second end of the coupler therein;

inserting the second cap end and the first fitting end into the coupler; and coupling, via the coupler, the cap with the fitting such that the coupler and the second cap end both contact the single arcuate fitting surface, wherein the cap is positioned at a longitudinal angle between 0° and 360° with the fitting and at a radial angle in a range with the fitting, wherein the fitting assembly is sized to receive electrical wires of the electrical conduit raceway therethrough.

20. The method of claim 19, further comprising forming a hollow coupler sized to receive the second cap end and the first fitting end therein, wherein coupling the cap further comprises:

coupling the second cap end with the first fitting end using the coupler.

21. The method of claim 20, wherein the second cap end includes cap threads, the coupler including coupler threads complementary to the cap threads, coupling the cap further comprising:

partially engaging the cap threads with the coupler threads;

positioning the cap and the fitting such that the cap is at a desired longitudinal angle and a desired radial angle with the fitting; and locking the fitting assembly by fully engaging the cap threads with the coupler threads.

22. The method of claim 19, wherein coupling the cap further comprises:

inserting the first fitting end into the second cap end; and restricting the head of the fitting from dislocating out of the second cap end using a clip and/or a sealing ring.

23. The method of claim 19, wherein coupling the cap further comprises:

positioning the first fitting end at the second cap end; and stamping the second cap end toward the first fitting end such that the second cap end follows a shape of the head and restricts the head from dislocating out of the second cap end.

* * * * *